United States Patent [19]

Kaino et al.

[11] Patent Number: 4,700,344

[45] Date of Patent: Oct. 13, 1987

[54] PROCESSOR OVERRUN CIRCUIT

[75] Inventors: Masami S. Kaino, Del Mar; Rocky M-Y. Young, Escondido, both of Calif.

[73] Assignee: NCR Corporation, Dayton, Ohio

[21] Appl. No.: 873,937

[22] Filed: Jun. 13, 1986

[51] Int. Cl.⁴ .............................. H04J 3/02; H04J 1/16
[52] U.S. Cl. ......................................... 370/94; 370/13; 370/94; 455/607
[58] Field of Search ...................... 370/94, 89, 85, 13, 370/95; 340/825.5; 455/607, 12

[56] References Cited

U.S. PATENT DOCUMENTS 4,312,065  1/1982  Ulug ..................................... 370/94
4,617,565  10/1986  Nakata et al. ..................... 340/825.5

Primary Examiner—Douglas W. Olms
Assistant Examiner—Wellington Chin
Attorney, Agent, or Firm—Wilbert Hawk, Jr.; Edward Dugas

[57] ABSTRACT

A data processing system has a plurality of subsystems or terminals, each containing an independent processor, the terminals linked by a star coupler. The system includes a star coupler to which all the terminals are connected over sending and receiving transmission lines. The function of the coupler is to take the signals received by the coupler, logically ORing all these received signals, and redriving the resulting signal to all processors via the receive side transmission line. To prevent one terminal or processor from tying up the coupler for an undue length of time, the coupler includes means for detecting a message length exceeding a predefined maximum, and determines this to be an overrun condition. When the overrun occurs, the channel from the offending terminal or processor is blocked by the coupler from reaching the logical ORing functional center of the coupler. In this way, the linking section of the star coupler remains as an operative link among the remainder of the processors. When the channel from the offending terminal or processor is no longer transmitting the overrunning signal, this return to the idle condition is detected, and the link of the star coupler is again opened to all processors including the previously overrun terminal.

10 Claims, 3 Drawing Figures

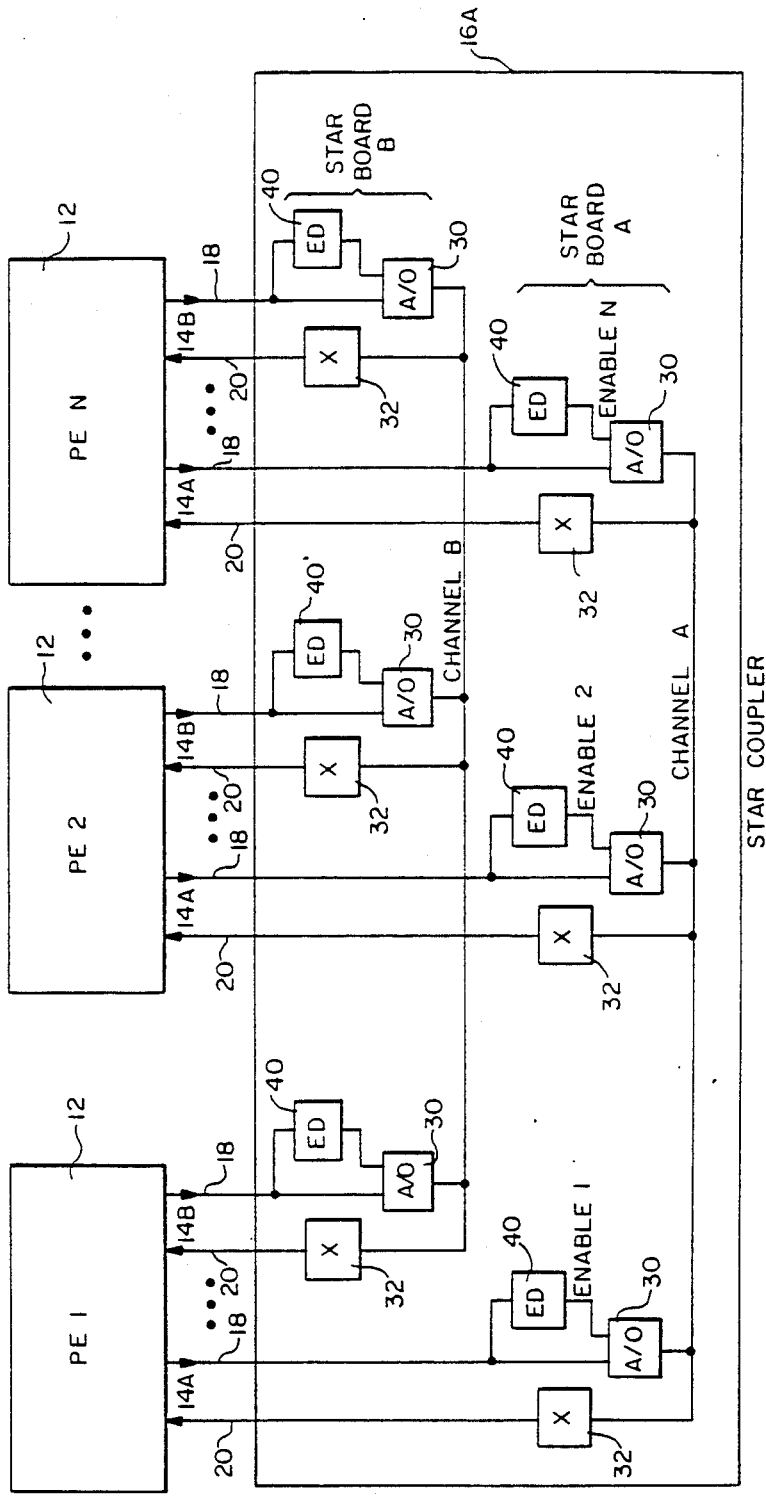
FIG.—2

PROCESSOR OVERRUN CIRCUIT

BACKGROUND OF THE INVENTION

This invention relates to data processing systems; more particularly to data processing systems of the type having a plurality of subsystems linked by a star coupler.

Star couplers are well known in data processing technology. Systems employing star couplers or couplers similar to star couplers are described, for example, in Metcalf & Boggs, "Ethernet: Distributed Packet Switching for Local Computer Networks," 19 Communications of the ACM 395 (July, 1976); Rawson & Metcalf, "Fibernet: Multimode Optical Fibers for Local Computer Networks," 26 IEEE Transactions on Communications, 983 (July, 1978); Data Processing System Having Dual Channel System Bus, Gunderson, et al. U.S. Pat. No. 4,417,334, Nov. 22, 1983; and Data Processing Subsystem Wherein At Least One Subsystem Has a Local Memory and a Mailbox Memory within the Local Memory for Storing Header Information, U.S. Pat. No. 4,387,441, Kocol, et al., June 7, 1983.

The latter two patents are assigned to the Assignee of this invention. The present invention is usable in the systems disclosed in these patents, which are incorporated herein by reference.

When used in a data processing system having a plurality of subsystems or terminals, a star coupler is typically connected to pairs of transmission lines, with one pair associated with each subsystem. A first transmission line of the pair carries signals away from the subsystem to the star coupler, and a second transmission line of the pair carries signals from the star coupler to the subsystem. When any subsystem transmits or generates a signal or message, that message is received by the star coupler from the first transmission line associated with the subsystem and is directed or passed to every subsystem by way of each second transmission line, including the second transmission line returning to the subsystem that transmitted the message. This of course offers advantages in linking multiple subsystems, since a subsystem transmitting a message receives back the message at the same time each of the other subsystems receives the message. The transmitting system can therefore check for any transmission errors, without requiring a receiving subsystem to regenerate the message.

The function of the star coupler is essentially to take all the signals received on the input side of the coupler on the first transmission lines, logically OR all these first transmission line signals, and redrive the resulting signal to all terminals or subsystems over the second transmission line of each pair.

There is, of course, a potential problem encountered in a system using a star coupler at this central linking section which logically ORs all the incoming signals on the first transmission lines. If a processor or subsystem continues to send message signals on a channel for an extended period of time, the entire system can be tied up. This problem is particularly serious in the situation where a processor fails in the transmit mode.

Another problem which must be addressed by this system is that of a subsystem which intermittently overruns its transmission time. That is, typically in systems of this type, the length of a message that may be sent by any single terminal or subsystem is limited so that the other terminals can contend for access to the common linking means at the star coupler. However, if a terminal overruns, but this situation only occurs intermittently, then the overrun may not be detected, but the efficiency of the star coupling system will be significantly reduced.

Yet another situation which must be accommodated in an overrun detection system is where a terminal or subsystem overruns the defined maximum length of a given message, but then ceases transmission and returns to normal operation. Without a properly designed overrun detection circuit, this terminal could be permanently locked out of the linking means of the star coupler.

SUMMARY OF THE INVENTION

It is an objective of this invention to provide an improved star-coupler type data processing system.

Another objective of this invention is to provide a data processing system having plural subsystems linked by a star coupler, with the star coupler having means for detecting an overrun message from any terminal or subsystem, and for locking that terminal out of the linking means in the coupler.

Another objective herein is to provide an overrun detection circuit in a star coupled data processing system which includes means for detecting the termination of an overrun condition from any terminal so that the terminal may be restored to access to the linking system of the star coupler.

In summary, provided herein is a data processing system having a plurality of subsystems or terminals each capable of transmitting or receiving messages through a channel connected star coupler, the coupler including means for linking or connecting messages from each subsystem to every other subsystem. The star coupler includes a processor overrun circuit for controlling the linking means in the coupler, so that when the coupler determines that an overrun condition exists on a transmission line from any subsystem, the channel from the offending subsystem processor is blocked from feeding data through the linking means. When the channel from the offending subsystem processor is no longer in the message overrun condition, the channel is reopened so the subsystem processor may again communicate through the linking means with the remaining processors of the data processing system.

Two overrun indicators are provided; a first being lit only for the duration of the overrun condition on a given channel, the second overrun indicator remaining lit once an overrun condition has been detected, to indicate which processor and channel were in the overrun condition.

More specifically, provided herein is a data processing system comprising subsystem processors linked through a star coupler, the processors transmitting messages through linking means incorporated in the star coupler which may not exceed a predetermined message length. On detection of a message on a channel from any processor exceeding the predefined length, an overrun signal is created, activating a logic means in the linking means to prevent the offending processor from transmitting messages through the linking means. Counting means are provided operating in conjunction with each channel to detect the absence of a message during a minimum period of time on the channel. On detecting this idle state, an idle condition signal is generated which resets the overrun condition counter and indicator, allowing the previously overrun processor to again access the linking means.

The objects and advantages of the present invention will become more apparent when taken in conjunction with the following description and the attached drawings.

BRIEF DESCRIPTION OF THE DRAWINGS

FIG. 2 is a more detailed block diagram of the star coupled data processing system of FIG. 1, illustrating the basic components of the overrun condition circuitry provided in association with each subsystem processor.

DESCRIPTION OF THE PREFERRED EMBODIMENT

Figure 1:
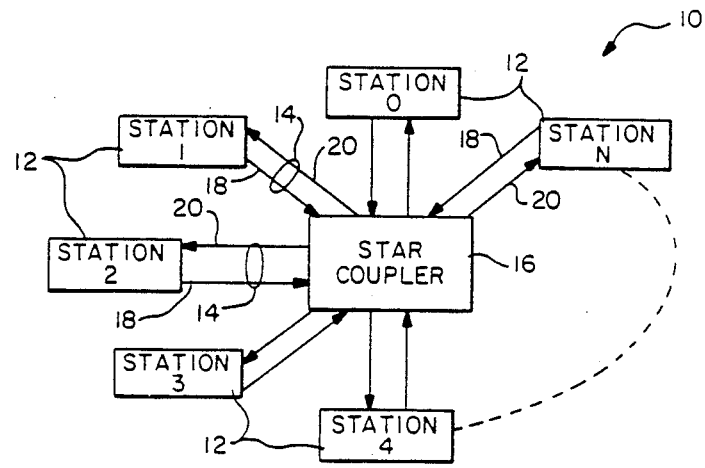
FIG. 1 is a simplified block diagram illustrating a data processing system having plural subsystems linked to a star coupler in accordance with the present invention.

Referring first to FIG. 1, there is shown in general form a data processing system 10 having a plurality of subsystems or stations 12 linked by bidirectional communication channels 14 to a star coupler 16 in accordance with this invention. The stations 12 are numbered 0-N; they communicate with a star coupler 6 over channels 14 comprised of a first serial transmission line 18 and a second serial transmission line 20. Each transmission line 18, 20 is a twisted pair adapted for differential signal transmission. Each transmission line 18 carries a serial signal or message generated by a processor in its associated station or subsystem to the star coupler 16, and each transmission line 20 carries a serial signal or message from star coupler 16 back to its associated subsystem.

In accordance with technology well known in this field and described in detail in the incorporated application, any message that is transmitted and carried along one of the transmission lines 18 from a station processor is received by the star coupler, and may be passed to each transmission line 20 going to the stations 12 in the system 10, including the station or subsystem transmitting the message.

The connecting configuration of this invention is shown in greater detail in FIG. 2 as it would be applied to a system of the type shown in the Gunderson patent incorporated above. As described in detail in the incorporated patent, the system may comprise a numberof terminal stations 1-N each including a processor PE having output transmission lines 18 running to multiple star boards A,B. More specifically, each station 12 is linked by an associated communication channel 14A to a star coupler 16A and by a separate associated communication channel 14B to a second star coupler 16B. Like the system shown in FIG. 1, each of the communication channels is comprised of a pair of transmission lines 18, 20. The line 18 carries signals from its associated station to one of the star couplers, and the other transmission line carries signals back from that star coupler to the station. As is known in the technology, and described in detail in that application, the function of the star board coupler is to connect all the processors of the various stations 12 together for interprocessor communication. This is achieved as shown in FIG. 2 by taking the signals received on the transmit channel 18, logically ORing all the signals received at the star coupler in a common linking means 30, and redriving the resulting signal using separate transmitters 32 to all of the processors over the return line 20.

It should be apparent from the description above and the incorporated application that a message transmitted from any one of the stations 12 can be sent over channel A or B. If the message is sent, for example, over channel A, it is transmitted along one of the transmission lines 18 to the star board coupler 16a. This star coupler 16A in turn directs the signal back along the other of the two transmission lines to the transmitting station, and also back to every other station in the system of FIG. 2, along the return transmission line of every cable 14A. Likewise, a signal may be transmitted from any one of the stations 12 along one of the two transmission lines in the associated cable 14B to the star coupler 16B. The star coupler 16B in turn directs the signal back to the transmitting station as well as every other station in the system along cables 14B.

Having two channels in the data processing system offers several significant advantages over the use of a single channel system such as illustrated in FIG. 1. Specifically, the dual channel system increases the reliability of the system since one channel can be used exclusively if the other should fail. In addition, the use of two channels increases the availability of the system for transmitting a message. That is, at the same time a first station is transmitting a message to a second station on one channel, a third station can transmit a message to a fourth station on the other channel without either of the messages interfering with the other.

It should be noted in looking at FIG. 2 that for purposes of illustration, it appears that a separate OR device is coupled to each transmission line 18. In fact, a single OR device is provided by the linking means on each star board as shown in greater detail in FIG. 3. In this way, the signal received on any channel transmission line 18 is ORed with all other received signals and redriven on all of the outgoing lines 20.

In a typical star coupled transmission system, before a processor 12 attempts to send a message on its outgoing line 18, to either channel A or B, it "listens" for an incoming message on line 20 of that channel. If it detects an idle (no data) condition, it will begin to send its message on that channel. If it detects a signal on the first channel, it listens to the other channel and attempts to send the message on that channel if an idle condition is found. When the processor begins to send a message to the star board, the linking means 30 at the board logically ORs that signal with signals on all other transmit lines 18 from the other processors of the system. The resulting signal is immediately sent to all processors 12 including the processor that sent it. If the sending processor sees exactly the same signal that it sent, it continues sending the message. If, however, the sending processor sees that another signal has been imposed on its message (as a result of OR function in the connecting means) the sending processor immediately halts the operation because a collision has apparently occurred on the channel. That is, the processor 12 detects that two processors are trying to transmit on this channel at the same time.

In order to allow all processors coupled to a single star board to have access to the coupler 16, and specifically the linking means 30 in the coupler, the length of a message that a processor may send before it must be terminated is limited to a maximum block length.

It can been seen that if the maximum length of this block is exceeded by any processor, that processor can bring to a halt the entire operation of the star coupler 16 A or B which is receiving the overrun message. To overcome this problem, the error detection device 40 of this invention has been provided coupled to each transmit line. As described in this preferred embodiment, the error detection device 40 is located on the star board. However, most of the electronics could as easily be incorporated into the processors at the individual terminals, with the signals indicating an overrun condition being used to terminate signal transmission at the terminal processor.

In this preferred embodiment the maximum message block length from a terminal has been determined to be 64k bytes. Therefore, in the error detection device of FIG. 3, counting means are provided comprising especially counter 50 to detect that a processor 12 has been holding a signal on a transmit channel 18 for a period of time of a predetermined defined length greater than the maximum allowable message length. The error detection device 40 determines that this is an overrun condition, and generates an OVERRUN signal from counter 50. When the overrun occurs, the channel from the offending processor 12 is blocked from reaching the linking means by sending a signal to a channel dedicated AND-gate 52 of the linking means 30. In this way, when the overrun occurs, the channel 18 from the offending processor 12 is blocked by this logic circuit comprising AND gate 52 from reaching the linking means 30 which would otherwise connect the excessive data output to a linking OR gate 54. All the remaining processors can continue to communicate through the linking means 30 and specifically the OR gate 54.

It is very possible that rather than the processor 12 having failed in the constant transmission mode, it merely intermittently sends a signal of greater than the maximum length. Therefore, a second counting means comprising counter 62 is provided for detecting an idle condition on each transmit channel. Upon detection of this idle condition, the state of the error detection device 40 is reset so that the transmitting channel 18 from the previously offending processor 12 can again reach the OR-gate 54 of the linking means 30. If a channel is transmitting normally this constant resetting prevents an overrun condition from being detected.

To provide an indication of both a current overrun and previous intermittent overrun conditions on a channel, each error detection device has two error indicators 64, 66. The first error indicator 64 is turned on only for the period of time the overrun condition exists, and is then extinguished. The second error indicator 66 is turned on upon detecting the error indication, and can only be extinguished manually by providing the signal MAN RESET on line 67. This way, both the fact of intermittent overuns on any channel, and the length or duration of such overruns can be immediately visually indicated. In this embodiment, the error indicators are visual; they are illustrated in the drawings as LEDs 64, 66. The same signals could be used to drive audible indicators, error counters or the like, utilizing error signal ERR1.

Figure 3:
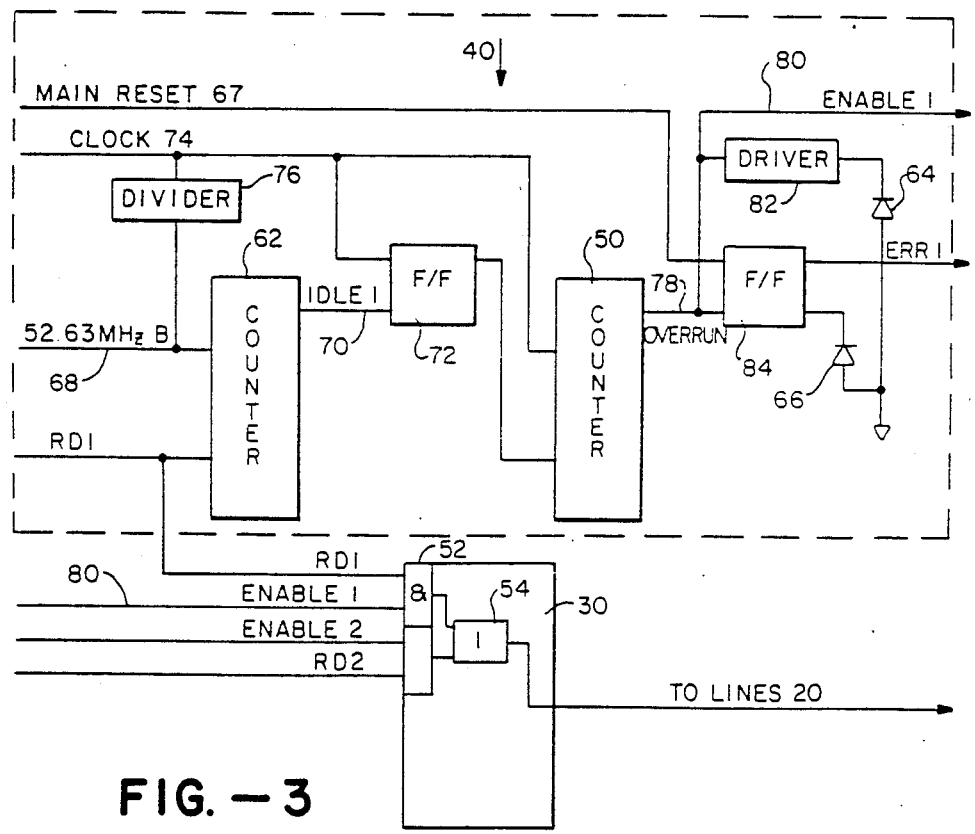
FIG. 3 is a detailed block diagram of the circuit components associated with each transmission channel used to detect the idle state of a channel and the overrun condition on any channel and to provide the necessary signal indicating the presence of such condition.

Turning to the details of the embodiment in FIG. 3, RD1 represents the data being received on any one of the lines 18 from a processor at a station 12. This data is being received at a 24 MHz rate by counter 62 (with the data being double frequency encoded; i.e., 1 slower, 0 faster). Star coupler A or B includes a clock source running at a frequency chosen to be slightly greater than the data rate of RD1, in this instance 53–63 MHz. Thus the clock signal on line 68 can be used to sample the data on the transmission line 18. In this way, an idle condition can be quickly detected.

For purposes of this preferred embodiment, the standard has been adopted that if the counter 62 counts to 8 without detection of a byte on line RD1, the idle output has been detected, and the IDLE1 signal is conveyed on line 70 to the flipflop 72. Setting of the IDLE1 signal clears the flipflop 72 and the counter 50 so that if an overrun signal had been established, it is now cleared. (This flipflop 72 also detects an idle between successive messages of proper length from the same processor, so that no false overrun signals are created.)

As note above, the counter 50 defines a maximum block length during which time a single channel 18 can be transmitting. If this time is exceeded, an overrun condition is said to have been created. This counter is driven by a slowly running clock signal 74 provided by simply dividing the clock signal on line 68 using a counter/divider 76. The counter 50 is set to provide an OVERRUN signal when the clock signal 74 has provided a sufficient number of inputs to the counter 50 to define a period greater than the maximum message length allowed. In this preferred embodiment, the maximum message length is to be 64k bytes; the clock 74 therefore counts to approximately 80k bytes before providing the OVERRUN signal on output line 78. When the counter 50 reaches approximately 80k bytes, the OVERRUN signal on line 78 goes to a high level, and the counter 50 stops in this condition. The ENABLE signal transmitted on line 80 to the AND-gate 52 changes state. This AND-gate 52 is also receiving the data RD1 from line 18. In the presence of the ENABLE1 signal, the gate 52 is blocked, and the message signal RD1 can no longer reach the linking means OR gate 54.

As can be seen by comparison of the inputs to the linking means 30 to the multiterminal array of FIG. 2, each terminal provides two inputs to the linking means, comprising a data line RD1, RD2, . . . RDN and an enable line ENABLE 1, ENABLE 2, . . . ENABLEN. The state of the ENABLE1 signal determines whether the data RD1 will be passed through the starboard linking means 30 into the common channel for connection to the return transmission line 20 to all the connected terminals 12.

To indicate that an error has occurred, the OVERRUN signal on line 78 turns on driven 82 to enable error indicator 64 for the duration of the overrun condition. The same signal also changes the state of the flipflop 84 to latch the long-term error indicator 66. In this way, the error indicator 64 is only driven for the duration of the overrun; the long-term error indicator 66 remains latched, so intermittent overruns can be visually detected.

As noted above, the system is self correcting so that if message line RD1 goes back to idle, the counter 62 is reset in the manner described above, providing the IDLE1 signal on line 70 to flipflop 72, changing the state of this flipflop. This in turn resets counter 50, terminating the OVERRUN signal, and chaning the state of the ENABLE1 signal on line 80 so that the channel through AND-gate 52 is again unblocked. In this way, the message on line RD1 can pass through the AND-gate 52 and reach the OR gate 54 of the star coupler linking means 30. With receipt of the next message from the previously blocked station 12, the data message passes through the AND-gate 52 and OR gate 54 of the star coupler, and is retransmitted through the common output line to the return transmission lines 20.

In view of the foregoing, it will now be understood that the present invention provides a star coupler configured communication network which is capable of detecting an overrun condition from any processor, and blocking that processor from further communication through the star coupler to the remaining processors of the system until the overrun condition is terminated. The present preferred embodiment has been described above. However, it should be appreciated that within the purview of the present invention various changes may be made within the scope of the following claims.

What is claimed:

1. In a star configured communications network having a plurality of terminals, a star coupler, and a plurality of bidirectional communication channels coupled between said star coupler and respective ones of said terminals for transferring data in blocks of a first defined maximum length, said bidirectional communication channels each including a first transmission line for carrying said data from one of said terminals to said star coupler and a second transmission line for carrying said data from said star coupler to said terminal, said star coupler including linking means for coupling the data from each of said first transmission lines to all of said second transmission lines whereby data from any of said terminals is transferred to all of said terminals, an improved means for detecting a data overrun condition on one of said first transmission lines from any one of said terminals comprising first counting means connected to each of said first transmission lines responsive to consecutive data pulses on said first line to generate an OVERRUN signal, said OVERRUN signal being transferred to said data coupling means in said star coupler to block data from said overrun first transmission line from reaching any of said second transmission lines whereby only the terminal sending data on the first transmission line creating the OVERRUN signal is blocked from reaching the remaining terminals, the linking means remaining accessible to all other terminals for transferring data from one of said first transmission lines to all of said second transmission lines.

2. A communication network as in claim 1 further including second counting means connected to each of said first transmission lines for detecting an idle condition on said transmission line and generating an IDLE signal, said second counting means includes means for coupling said IDLE condition signal to a reset input of said first counting means to permit data blocks from said first transmission line to reach all of said second transmission lines, whereby the terminal which caused generation of the OVERRUN condition signal can access the other terminals through the linking means upon termination of the overrun condition.

3. A communication system as in claim 2 wherein said first counting means comprise means for counting a predefined block length greater than said maximum block length, said OVERRUN signal being generated in the absence of receipt of said IDLE signal during said predetermined block length counting.

4. A communication system as in claim 3 further comprising first visual error indicator means responsive to said OVERRUN condition signal for visually indicating said overrun condition.

5. A communication system as in claim 4 wherein said first visual error indicator means is responsive to the state of said OVERRUN signal, said system including second visual error indicator means responsive to the setting of said OVERRUN signal to indicate said overrun condition.

6. A data processing system comprising
a plurality of terminals,
a star coupler,
first and second transmission lines running between each of said terminals and said star coupler, each said first transmission line carrying signal blocks from said terminal to said coupler, each said second transmission line carrying messages comprising signal blocks of a maximum length from said coupler to said terminal, said star coupler comprising linking means for linking each of said first transmission lines to every one of said second transmission lines so that each of said messages from one of said first transmission lines can be passed to all of said second transmission lines,
said system comprising means for controlling said first transmission lines' access to said linking means comprising detector means for detecting said messages on each of said first transmission lines,
first counting means coupled to said detector means for determining that a message on one of said transmission lines has exceeded said maximum block length and for generating an OVERRUN signal, and logic means responsive to said OVERRUN signal for denying messages on said one first transmission line acccess to said star coupler linking means whereby the first transmission line is blocked from the remaining terminals, but the linking means remains accessible for transferring messages from all other of said terminals.

7. A communication network as in claim 6 further including second counting means connected to each of said first transmission lines for detecting an idle condition on said transmission line and generating an IDLE signal, said second counting means including means for coupling said IDLE condition signal to a reset input of said first counting means to permit messages from said first transmission line to reach said second transmission line on receipt of said IDLE signal whereby the terminal which caused generation of the overrun condition can thereafter access the other terminals through the linking means.

8. A communication system as in claim 7, said first counting means comprise means for counting a block length greater than said defined block length, said OVERRUN condition signal being set in the absence of receipt of said IDLE signal during said block length counting.

9. A communication system as in claim 8 further comprising first visual error indicator means responsive to said OVERRUN condition signal for visually indicating said overrun condition.

10. A communication system as in claim 9 wherein said first visual error indiciator means is responsive to the state of said OVERRUN signal, said system including second visual error indicator means responsive to the setting of said OVERRUN signal to indicate said overrun condition.

* * * * *